(12) United States Patent
Sahara

(10) Patent No.: US 10,278,271 B2
(45) Date of Patent: Apr. 30, 2019

(54) FACILITY MANAGEMENT SYSTEM

(71) Applicant: JTEKT CORPORATION, Osaka-shi (JP)

(72) Inventor: Yuta Sahara, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/142,551

(22) Filed: Sep. 26, 2018

(65) Prior Publication Data
US 2019/0104600 A1 Apr. 4, 2019

(30) Foreign Application Priority Data
Sep. 29, 2017 (JP) ................... 2017-191614

(51) Int. Cl.
*H05B 37/02* (2006.01)
*G05B 15/02* (2006.01)

(52) U.S. Cl.
CPC ..... *H05B 37/0272* (2013.01); *H05B 37/0227* (2013.01); *G05B 15/02* (2013.01)

(58) Field of Classification Search
CPC ............... H05B 37/02; H05B 37/0227; H05B 37/0272; G05B 15/02
USPC .... 315/152–158, 209 R, 291, 297, 299, 307, 315/308, 312
See application file for complete search history.

(56) References Cited

U.S. PATENT DOCUMENTS 8,138,690 B2 * 3/2012 Chemel ................... F21V 17/02
                                                          315/318
9,807,858 B2 * 10/2017 Recker ..................... H02J 9/02

FOREIGN PATENT DOCUMENTS

JP          2004-6291        1/2004

* cited by examiner

*Primary Examiner* — Jimmy T Vu
(74) *Attorney, Agent, or Firm* — Oblon, McClelland, Maier & Neustadt, L.L.P.

(57) ABSTRACT

In a facility management system, a controller that constitutes an information acquisition device attached to a signal lamp executes: an acquisition process of acquiring light emission information using a sensor; a transmission process of wirelessly transmitting the light emission information after the acquisition process; and a hibernation process of bringing the controller into a hibernation state corresponding to a power-saving mode in a period from the transmission process to the next acquisition process. The time of the hibernation process is a variable time set in accordance with a hibernation random number.

9 Claims, 11 Drawing Sheets

FACILITY MANAGEMENT SYSTEM

INCORPORATION BY REFERENCE

The disclosure of Japanese Patent Application No. 2017-191614 filed on Sep. 29, 2017 including the specification, drawings and abstract, is incorporated herein by reference in its entirety.

BACKGROUND OF THE INVENTION

1. Field of the Invention

The present invention relates to a facility management system.

2. Description of the Related Art

In a production line or the like in which the status of operation of a processing facility can be transmitted from the processing facility to a management device, a worker or a manager can easily grasp the status of operation to improve the production efficiency as a result. In order to transmit the status of operation of the existing processing facility to the management device, however, it is necessary to change the setting of the existing control device or add a new control device thereto. The setting of the existing control device is changed by changing software (such as a ladder circuit) of a controller (such as a PLC) of the existing processing facility, for example. A new control device is added by adding a relay component for taking in an input signal to the PLC. This increases the cost and the number of man-hours.

Japanese Patent Application Publication No. 2004-6291 (JP 2004-6291 A) describes a device provided to a signal lamp mounted to the existing processing facility to allow transmission of the status of operation of the existing processing facility from the existing processing facility to a management device. That is, this device detects a signal lamp that emits light in accordance with the status of operation of the existing processing facility, and transmits a detection signal to the outside through a wireless device. This device eliminates the need to change the setting of the existing control device or add a new control device.

The signal lamp is occasionally flashed in order to display the state of the processing facility. It is necessary to shorten the sampling cycle of a sensor in order to detect the flashing state. Shortening the sampling cycle increases the amount of power consumption by the sensor, a controller, or the like.

Further, in the case where a signal is wirelessly transmitted from a plurality of processing facilities to the management device, packets transmitted from the plurality of processing facilities may collide against each other. If the transmitted packets collide against each other, the management device may not be able to acquire appropriate information.

SUMMARY OF THE INVENTION

It is an object of the present invention to provide a facility management system that allows reducing the amount of power consumption and that allows a management device to acquire accurate information by avoiding a collision between transmitted packets.

An aspect of the present invention provides a facility management system including:

a plurality of processing facilities;

a plurality of signal lamps that indicate information on the plurality of processing facilities, respectively;

a plurality of information acquisition devices that are attached to the plurality of signal lamps, respectively, that acquire light emission information on the plurality of signal lamps, respectively, and that wirelessly transmit the light emission information; and a management device that wirelessly receives the light emission information which is transmitted by each of the plurality of information acquisition devices and that manages a state of the corresponding processing facility on the basis of the light emission information.

Each of the plurality of information acquisition devices includes a sensor that acquires the light emission information and a controller that controls the sensor. The controller executes an acquisition process of acquiring the light emission information using the sensor, a transmission process of wirelessly transmitting the light emission information executed after the acquisition process, and a hibernation process of bringing the controller into a hibernation state corresponding to a power-saving mode executed in a period from the transmission process to the next acquisition process. A time of the hibernation process is a variable time set in accordance with a hibernation random number.

With the facility management system according to the aspect described above, the hibernation process in which the controller is brought into the hibernation state corresponding to the power-saving mode is executed during a period from the transmission process to the next acquisition process. That is, the controller has a time in which the controller is brought into the hibernation state, rather than performing the acquisition process and the transmission process. Therefore, the amount of power consumption by the controller can be reduced.

Further, the time of the hibernation process is a variable time set in accordance with a hibernation random number. Therefore, the timing when one information acquisition device wirelessly transmits the light emission information and the timing when a different information acquisition device wirelessly transmits the light emission information differ from each other. Thus, a collision between a plurality of transmitted packets wirelessly transmitted by a plurality of information acquisition devices can be avoided. As a result, the management device can reliably acquire information related to the plurality of processing facilities.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
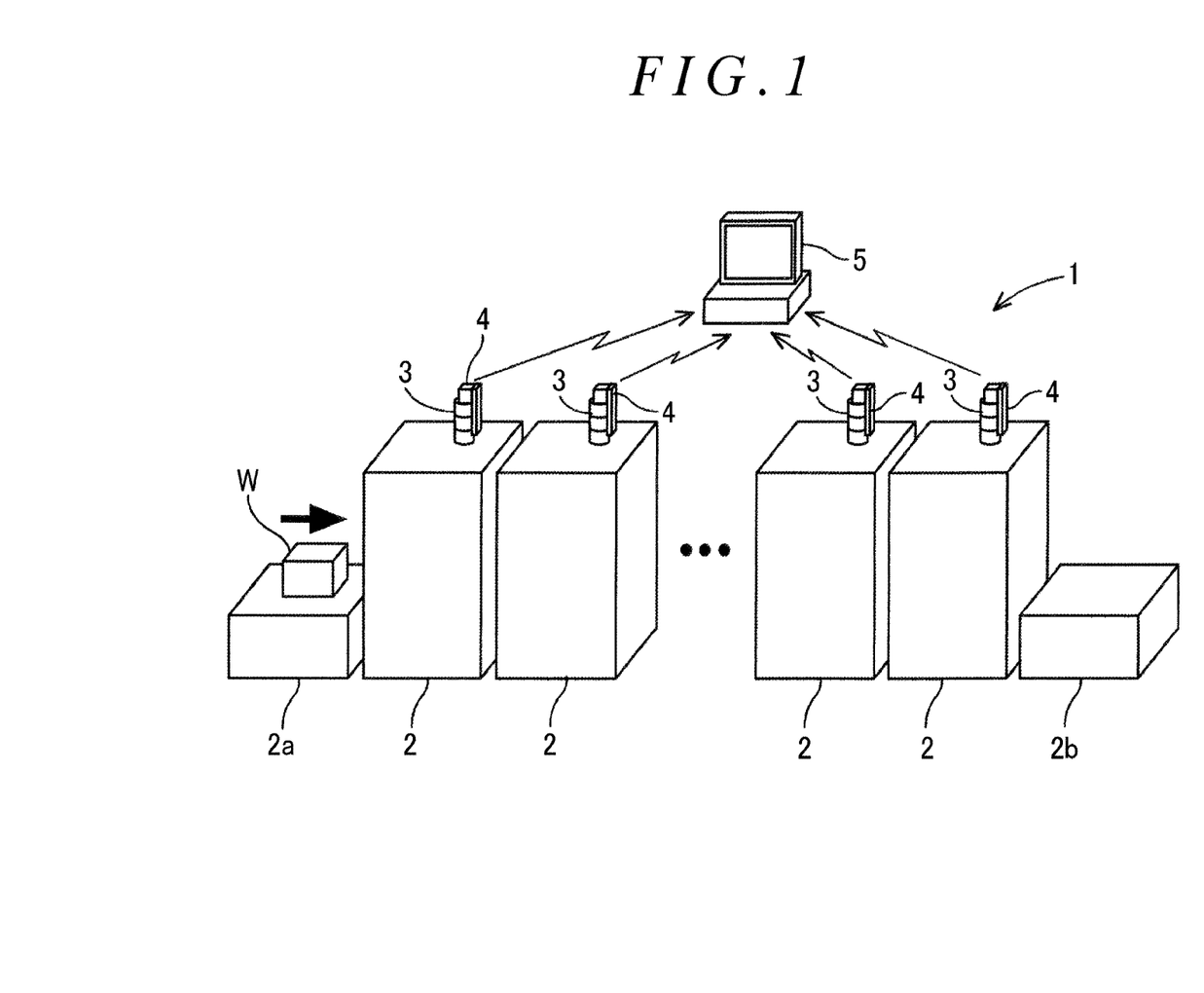
FIG. 1 illustrates the overall configuration of a facility management system.

A facility management system 1 will be described with reference to FIG. 1. The facility management system 1 includes a plurality of processing facilities 2, and manages the state of the plurality of processing facilities 2. As illustrated in FIG. 1, the facility management system 1 includes a plurality of processing facilities 2, a plurality of signal lamps 3, a plurality of information acquisition devices 4, and a management device 5.

Examples of the processing facilities 2 include a production device that processes, assembles, etc. a workpiece W, a conveyance device that conveys the workpiece W, an inspection device that inspects the workpiece W, and so forth. Examples of the processing include cutting, plastic working, quenching, and so forth. In FIG. 1, a plurality of machine tools that cut and grind the workpiece W while conveying the workpiece W are illustrated as the plurality of processing facilities 2, and a production line that includes the plurality of machine tools is illustrated. That is, the plurality of processing facilities 2 which serve as machine tools are arranged in the production line, sequentially process the workpiece W as a material carried in from a carry-in device 2a, and carry out the workpiece W after being processed from a carry-out device 2b.

For example, the processing facility 2 which is arranged at a first position in the production line checks whether or not the workpiece W as a material is carried into the carry-in device 2a. In the case where the workpiece W is not carried in, it is necessary for a worker to prepare the workpiece W. The processing facilities 2 which are arranged at second and subsequent positions do not perform such checking.

The plurality of signal lamps 3 are attached to the plurality of processing facilities 2, respectively. The signal lamps 3 are provided on the top plate of the processing facilities 2 so as to be visually recognizable by a worker and a manager from a distance. The signal lamps 3 indicate information on the processing facilities 2, to which the signal lamps 3 are attached, through light emission. The signal lamps 3 are configured to be able to emit light in a plurality of colors. For example, the signal lamps 3 are each constituted by stacking three translucent plastic cases in a hollow cylindrical shape and placing a light source such as an LED inside each of the plastic cases. The plastic cases are lit up and flashed in red, yellow, and green sequentially from the upper level, for example. It should be noted, however, that the signal lamps 3 are not limited to having three colors, and may have fewer colors such as one or two colors, or may have more colors such as four or five colors. The display colors may be a variety of colors other than red, yellow, and green.

The signal lamp 3 indicates that the processing facility 2 is operating abnormally when the signal lamp 3 is continuously lit up in red, indicates that the processing facility 2 needs maintenance when the signal lamp 3 is continuously lit up in yellow, and indicates that the processing facility 2 is operating normally when the signal lamp 3 is continuously lit up in green. The signal lamp 3 indicates that the workpiece W has not been carried into the carry-in device 2a, which is positioned immediately before the processing facility 2, when the signal lamp 3 is flashed in red. The target of light-on and flashing is changeable as appropriate through setting. For example, the signal lamp 3 may be configured not to be flashed, depending on the processing facility 2.

The plurality of information acquisition devices 4 are attached to the plurality of signal lamps 3, respectively. The information acquisition devices 4 can each acquire light emission information on the signal lamp 3 to which the information acquisition device 4 is attached, and wirelessly transmit the acquired light emission information.

The management device 5 wirelessly receives the light emission information which is transmitted by each of the plurality of information acquisition devices 4. The management device 5 determines, on the basis of the light emission information, which of a continuous light-on state, a flashing state, and a continuous light-off state each of the plurality of signal lamps 3 is in. The management device 5 manages the state of the plurality of processing facilities 2. The management device 5 displays the overall operating status of the plurality of processing facilities 2 on the basis of the received light emission information in a visually recognizable manner using a graph, a diagram, or the like.

The management device 5 is installed in a management office of a factory in which the production line is installed, for example, and is viewable by the manager or the worker. That is, the manager or the worker can grasp the state of the plurality of processing facilities 2 by checking the management device 5. Besides the above, the management device 5 may also be implemented as a wearable terminal, for example. In this case, the manager or the worker can grasp the state of the plurality of processing facilities 2 while moving.

Figure 2A:
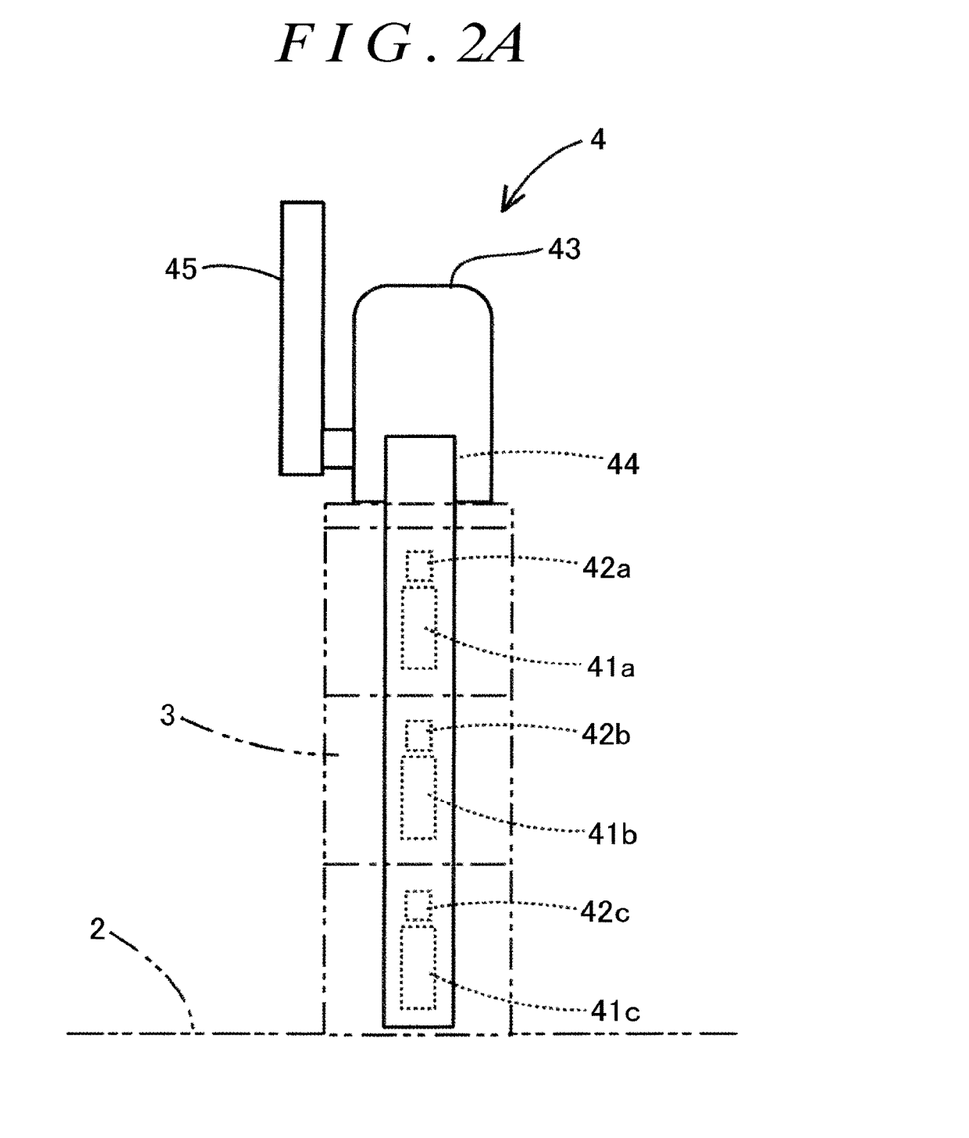
FIG. 2A is an enlarged front view of an information acquisition device.
Figure 2B:
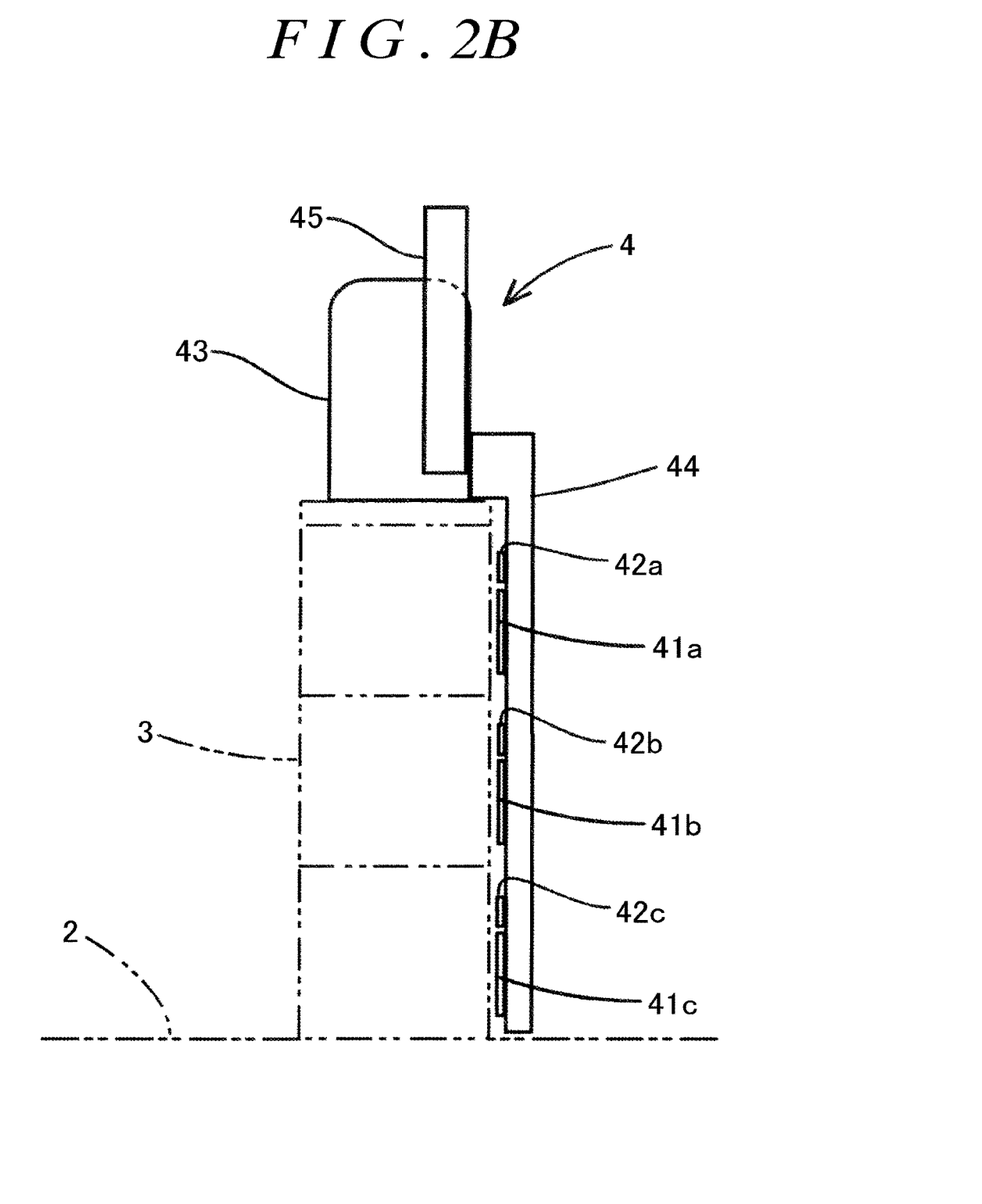
FIG. 2B is an enlarged left side view of the information acquisition device.

The configuration of the information acquisition device 4 will be described with reference to FIGS. 2A and 2B. The information acquisition device 4 includes three sensors 41a, 41b, and 41c, three power generation devices 42a, 42b, and 42c, a device body 43, a flexible wiring substrate 44, and an antenna 45.

The three sensors 41a, 41b, and 41c are disposed at positions corresponding to the respective light sources of the signal lamp 3. The three sensors 41a, 41b, and 41c detect a physical quantity related to the brightness of light from the respective light sources. Examples of the physical quantity related to the brightness include illuminance (luminous flux (lux (lx)) that is incident per unit area (1 m$^2$)), luminous flux (amount of light (lumen (lm)) transmitted per unit time), luminous intensity, and luminance. The three sensors 41a, 41b, and 41c may each be a photodiode that outputs a light detection signal at 0 V to 2 V (which varies in accordance with the amount of light or the luminous flux), for example.

The three power generation devices 42a, 42b, and 42c are disposed at positions corresponding to the respective light sources of the signal lamp 3 and in the vicinity of the three sensors 41a, 41b, and 41c, respectively. The three power generation devices 42a, 42b, and 42c generate power by light from the respective light sources of the signal lamp 3. The three power generation devices 42a, 42b, and 42c are each a solar cell of a crystal silicon type, for example.

The device body 43 is attached to the upper end of the signal lamp 3, and electrically connected to the three sensors 41a, 41b, and 41c and the three power generation devices 42a, 42b, and 42c. The device body 43 includes a power source, and controls acquisition of light emission information on the light sources of the signal lamp 3 by the three sensors 41a, 41b, and 41c. The device body 43 further controls power generation by the three power generation devices 42a, 42b, and 42c and wireless transmission of various kinds of information.

The flexible wiring substrate 44 is connected to a side of the device body 43, and provided to extend downward along the signal lamp 3. That is, the flexible wiring substrate 44 is disposed so as to face the light sources of the signal lamp 3. The three sensors 41a, 41b, and 41c and the three power generation devices 42a, 42b, and 42c discussed above are attached to the flexible wiring substrate 44. The antenna 45 is attached to the device body 43.

The circuit configuration of the information acquisition device 4 will be described with reference to FIG. 3. As discussed above, the information acquisition device 4 includes the device body 43. The device body 43 is electrically connected to the three sensors 41a, 41b, and 41c, the three power generation devices 42a, 42b, and 42c, and the antenna 45.

Figure 3:
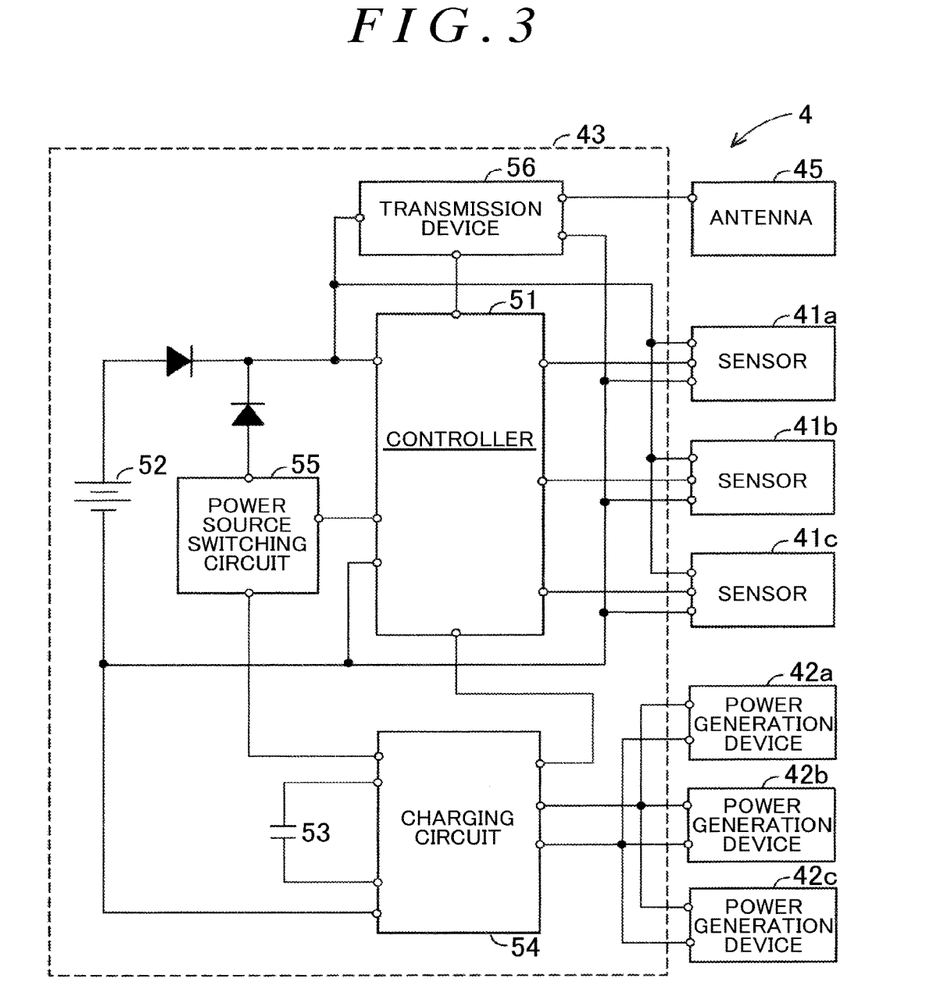
FIG. 3 illustrates the circuit configuration of an information acquisition device according to a first embodiment.

As illustrated in FIG. 3, the device body 43 includes a controller 51, a first power source 52, a second power source 53, a charging circuit 54, a power source switching circuit 55, and a transmission device 56. The controller 51 is constituted of a central processing unit (CPU), for example. The controller 51 executes control of acquisition of light emission information by the three sensors 41a, 41b, and 41c, control of transmission of the light emission information, a hibernation process of bringing the controller 51 into a hibernation state corresponding to a power-saving mode, acquisition of voltage monitor information on the second power source 53 from the charging circuit 54, control of output of High/Low signals to the power source switching circuit, and so forth.

The first power source 52 serves as a main power source, and is a chargeable dry battery, for example, such as a replaceable battery, for example. The second power source 53 serves as an auxiliary power source, and has a role of supplementing the first power source 52 which serves as a main power source. It should be noted, however, that the second power source 53 may serve as a main power source and the first power source 52 may serve as an auxiliary power source. The second power source 53 is constituted of a capacitor. The second power source 53 is charged by the charging circuit 54 with power generated by the three power generation devices 42a, 42b, and 42c.

The charging circuit 54 executes control of power generation by the three power generation devices 42a, 42b, and 42c, acquires the generated power, and charges the second power source 53 with the acquired power. The charging circuit 54 further outputs voltage monitor information on the second power source 53 to the controller 51.

The power source switching circuit 55 switches through the controller 51 between a state in which power of the second power source 53 is output and a state in which power of the second power source 53 is not output. In the case where the voltage monitor information which is acquired from the charging circuit 54 is less than a predetermined value, the controller 51 outputs a High signal. In this case, the power source switching circuit 55 switches to the state in which power of the second power source 53 is output. That is, in the case where the voltage of the second power source 53 is low, the first power source 52 supplies power. In the case where the acquired voltage monitor information is not less than the predetermined value, on the other hand, the controller 51 outputs a Low signal. In this case, the power source switching circuit 55 switches to the state in which power of the second power source 53 is not output. In this event, the second power source 53 is only charged.

The transmission device 56 wirelessly transmits the light emission information which is acquired by the three sensors 41a, 41b, and 41c via the antenna 45 in the case where an instruction for a transmission process is provided from the controller 51. The wireless transmission is performed through packet communication.

Next, acquisition and transmission processes performed by the controller 51 will be described with reference to FIGS. 4A, 4B, and 5 to 7. The controller 51 sequentially executes a light emission information acquisition process, a transmission process of wirelessly transmitting the light emission information, and a hibernation process, and repeats such processes. In the light emission information acquisition process, light emission information is acquired by the sensors 41a, 41b, and 41c. The transmission process includes an initial transmission process of wirelessly transmitting the light emission information after the acquisition process, and a re-transmission process of wirelessly transmitting the identical light emission information again after the initial transmission process. In the hibernation process, the controller 51 is brought into the hibernation state corresponding to the power-saving mode during a period from the transmission process to the next acquisition process. In the hibernation state, the controller 51 enters a so-called sleep mode or hibernation mode to be turned off.

Figure 4A:
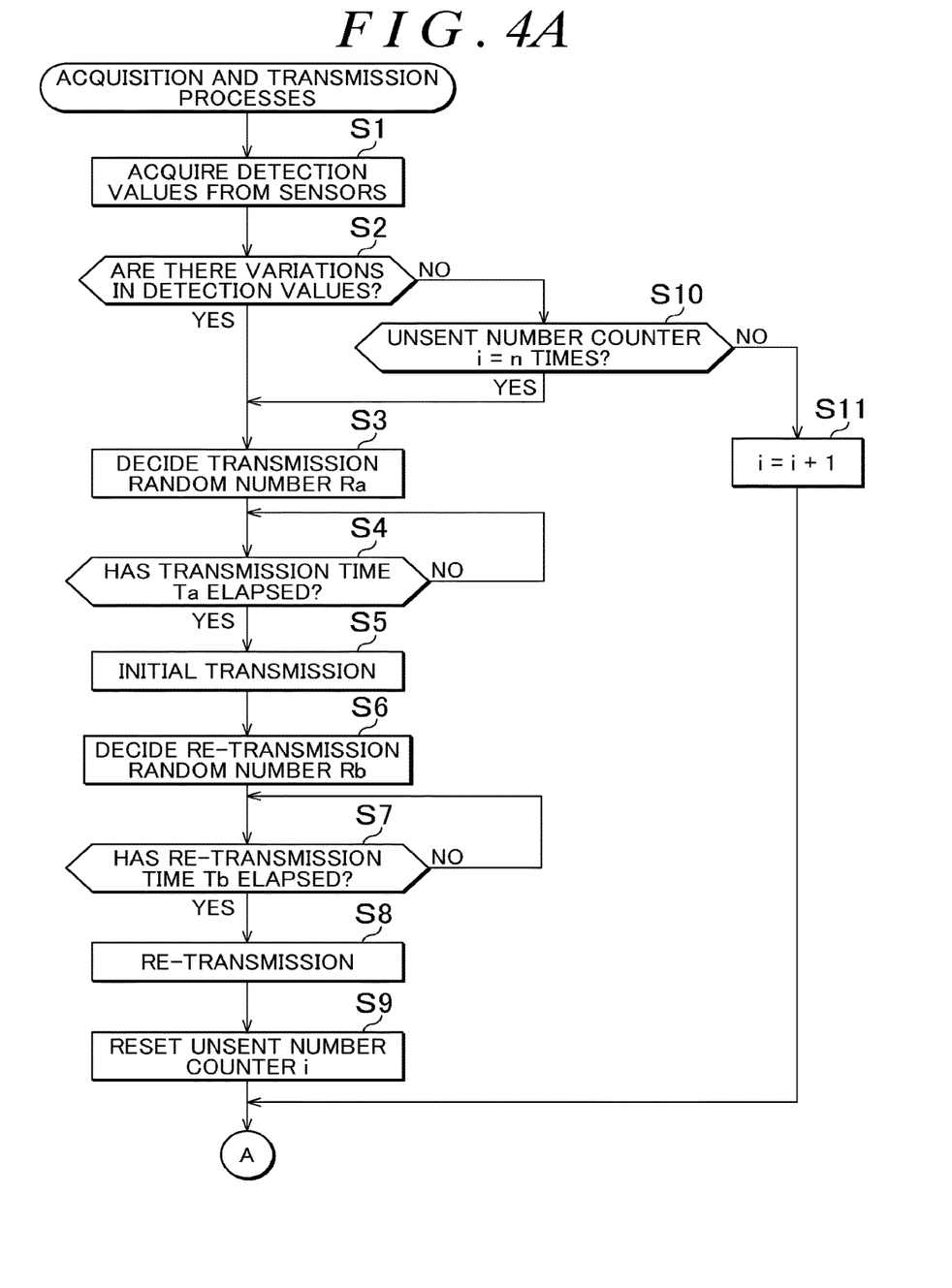
FIG. 4A is a flowchart of acquisition and transmission processes performed by a controller of the information acquisition device.
Figure 4B:
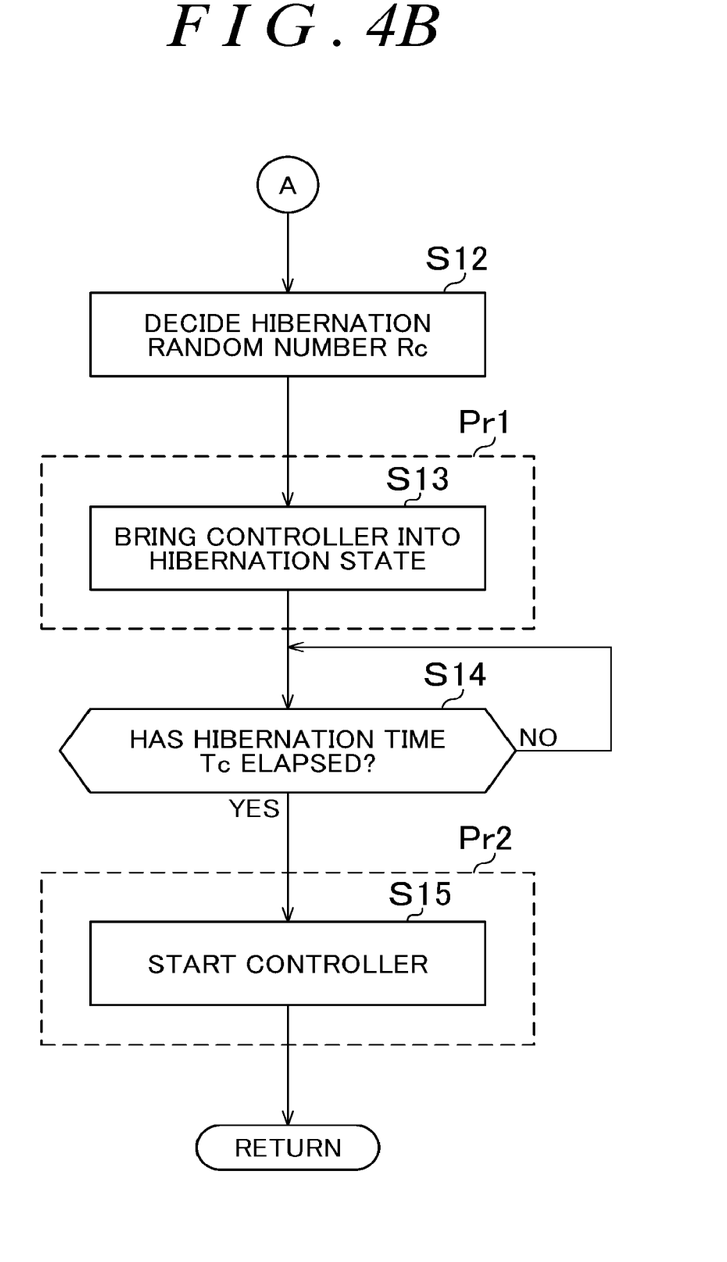
FIG. 4B is a flowchart of the acquisition and transmission processes performed by the controller of the information acquisition device.

Regarding the acquisition process, the initial transmission process, the re-transmission process, and the hibernation process which are performed by the controller 51, process procedures performed by the controller 51 will be described in detail below.

First, the controller 51 acquires detection values from the sensors 41a, 41b, and 41c (S1). The controller 51 determines whether or not there are variations in detection values (S2). Whether or not there are variations in detection values is determined in accordance with whether or not the amount of variation in brightness (amount of variations in physical quantity related to the brightness) is equal to or more than a threshold. It is determined that there are not variations in detection values in accordance with a fact that the amount of variation in brightness is not equal to or more than the threshold.

The detection values are varied in the case where the signal lamp 3 is varied from the continuous light-off state to the continuous light-on state and in the case where the signal lamp 3 is varied from the continuous light-on state to the continuous light-off state. In this case, it is determined in S2 in FIG. 4A that there are variations in detection values (S2: Yes). On the other hand, the detection values are not varied in the case where the signal lamp 3 is maintained in the continuous light-off state and in the case where the signal lamp 3 is maintained in the continuous light-on state. In this case, it is determined in S2 in FIG. 4A that there are not variations in detection values (S2: No).

In the case where there are variations in detection values (S2: Yes), the controller 51 decides a transmission random number Ra (S3). The transmission random number Ra is a dimensionless number that is used to set an initial transmission time Ta which is a variable time. The initial transmission time Ta corresponds to the transmission random number Ra. The transmission random number Ra is determined in the range of 0 to 5, for example. In the present embodiment, the initial transmission time Ta has the same value as that of the transmission random number Ra. That is, the initial transmission time Ta which is set in accordance with the transmission random number Ra is fluctuated in the range of 0 ms to 5 ms.

Figure 5:
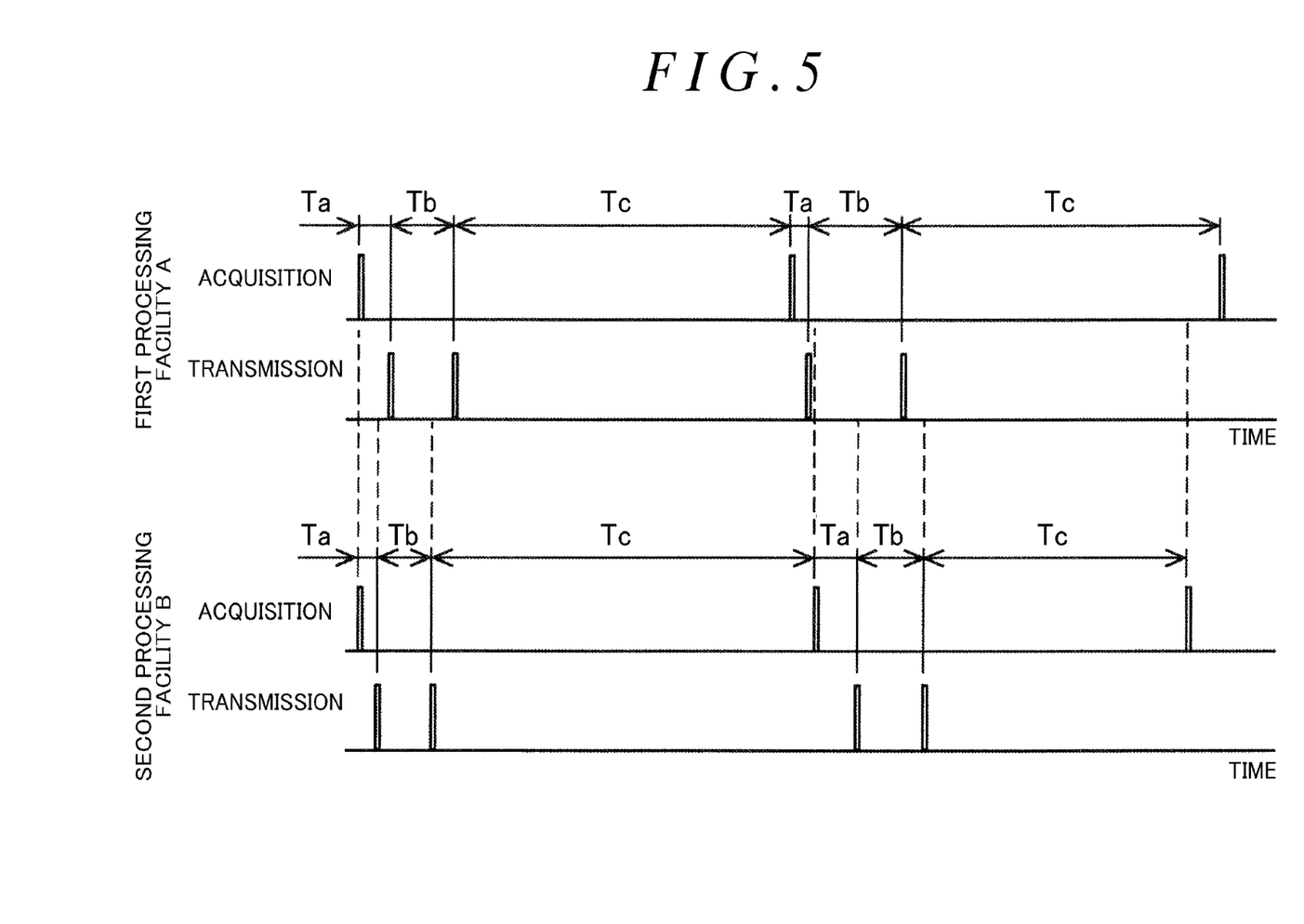
FIG. 5 is a timing chart related to the acquisition process and the transmission process performed by the information acquisition device in the case where there are variations in detection values from sensors, in which the upper chart indicates a process performed by an information acquisition device corresponding to a first processing facility A and the lower chart indicates a process performed by an information acquisition device corresponding to a second processing facility B.

As illustrated in FIG. 5, the initial transmission time Ta is a time from the light emission information acquisition process which is performed by the sensors 41a, 41b, and 41c to the initial transmission process for the light emission information. That is, the initial transmission time Ta from the acquisition process to the initial transmission process is fluctuated in the range of 0 ms to 5 ms.

Subsequently, the controller 51 determines whether or not the initial transmission time Ta has elapsed since the acquisition process is executed (S4). This determination is continuously made before the initial transmission time Ta elapses (S4: No). When the initial transmission time Ta elapses (S4: Yes), the controller 51 executes the initial transmission process (S5). That is, the controller 51 wirelessly transmits the light emission information, which is acquired in S1 in FIG. 4A, through packet transmission using the transmission device 56.

As illustrated in FIG. 5, for example, the initial transmission time Ta corresponding to a first processing facility A and the initial transmission time Ta corresponding to a second processing facility B differ from each other with a high probability. Thus, the timing when the information acquisition device 4 corresponding to the first processing facility A wirelessly transmits light emission information and the timing when the information acquisition device 4 corresponding to the second processing facility B wirelessly transmits light emission information differ from each other with a high probability. Therefore, a collision between a plurality of transmitted packets wirelessly transmitted by a plurality of information acquisition devices 4 can be avoided. As a result, the management device 5 can reliably acquire information related to the plurality of processing facilities 2.

It should be noted, however, that transmitted packets may collide with each other in the case where there are a large number of processing facilities 2. Thus, as illustrated in FIG. 4A, the controller 51 decides a re-transmission random number Rb (S6) after the initial transmission process is executed (S5). The re-transmission random number Rb is a dimensionless number that is used to set a re-transmission time Tb which is a variable time. The re-transmission time Tb corresponds to the re-transmission random number Rb. The re-transmission random number Rb is determined in the range of 0 to 20, for example. In the present embodiment, the initial transmission time Tb has the same value as that of the re-transmission random number Rb. That is, the re-transmission time Tb which is set in accordance with the re-transmission random number Rb is fluctuated in the range of 0 ms to 20 ms.

As illustrated in FIG. 5, the re-transmission time Tb is a time from the initial transmission process to the re-transmission process. That is, the re-transmission time Tb from the initial transmission process to the re-transmission process is fluctuated in the range of 0 ms to 20 ms.

Subsequently, the controller 51 determines whether or not the re-transmission time Tb has elapsed since the initial transmission process is executed (S7). This determination is continuously made before the re-transmission time Tb elapses (S7: No). When the re-transmission time Tb elapses (S7: Yes), the controller 51 executes the re-transmission process (S8). That is, the controller 51 wirelessly transmits the light emission information, which is acquired in S1 in FIG. 4A, again through packet transmission using the transmission device 56.

As illustrated in FIG. 5, for example, the re-transmission time Tb corresponding to the first processing facility A and the re-transmission time Tb corresponding to the second processing facility B differ from each other with a high probability. Thus, the timing when the information acquisition device 4 corresponding to the first processing facility A re-transmits light emission information and the timing when the information acquisition device 4 corresponding to the second processing facility B re-transmits light emission information differ from each other with a high probability. Therefore, a collision between a plurality of transmitted packets re-transmitted by a plurality of information acquisition devices 4 can be avoided even if the transmitted packets which are transmitted initially collide against each other. As a result, the management device 5 can reliably acquire information related to the plurality of processing facilities 2.

The controller 51 is not in the hibernation state during a period from the acquisition process to the initial transmission process and a period from the initial transmission process to the re-transmission process. In the hibernation state, the controller 51 is brought into the power-saving mode. That is, the controller 51 consumes at least standby power during a period from the acquisition process to the initial transmission process and a period from the initial transmission process to the re-transmission process.

Therefore, the controller 51 consumes more standby power as the time periods are longer, and therefore the time periods are preferably as short as possible. Thus, the minimum value of the initial transmission time Ta and the minimum value of the re-transmission time Tb are set to 0 ms. That is, there are a case where the initial transmission process is executed immediately after the acquisition process and a case where the re-transmission process is executed immediately after the initial transmission process.

On the other hand, the maximum (5 ms) of the initial transmission time Ta and the maximum (20 ms) of the re-transmission time Tb are set to different times. The re-transmission process is intended as a backup to the initial transmission process in case the transmitted packets collide against each other, and therefore it is desired that the initial transmission time Ta and the re-transmission time Tb should be set to different times. Thus, the maximum values of the times Ta and Tb are set to different values. In particular, by setting the maximum value of the re-transmission time Tb to be larger than the maximum value of the initial transmission time Ta, the probability of avoiding a re-collision between the transmitted packets can be increased in the case where the re-transmission process is executed after the transmitted packets collide against each other in the initial transmission process.

Subsequently, as illustrated in FIG. 4A, the controller 51 resets an unsent number counter i (S9). The unsent number counter i indicates the number of times when the transmission process is not executed even in the case where the controller 51 executes the acquisition process. The unsent number counter i is incremented in the case where the acquisition process is executed and the initial transmission process and the re-transmission process are not executed, and reset when the initial transmission process and the re-transmission process are executed.

Subsequently, as illustrated in FIG. 4B, the controller 51 decides a hibernation random number Rc (S12). The hibernation random number Rc is a dimensionless number that is used to set a hibernation time Tc (time for the hibernation process Pr1) which is a variable time. The hibernation time Tc corresponds to the hibernation random number Rc. The hibernation random number Rc is determined in the range of 500 to 1000, for example. In the present embodiment, the hibernation time Tc has the same value as that of the hibernation random number Rc. That is, the hibernation time Tc which is set in accordance with the hibernation random number Rc is fluctuated in the range of 500 ms to 1000 ms.

As illustrated in FIG. 5, the hibernation time Tc is a time from the re-transmission process to the next acquisition process. That is, the hibernation time Tc from the re-transmission process to the next acquisition process is fluctuated in the range of 500 ms to 1000 ms.

Subsequently, the controller 51 brings the controller 51 itself into the hibernation state as the hibernation process Pr1 (S13). In the hibernation state, as discussed above, the controller 51 enters the power-saving mode (sleep mode or hibernation mode) to be turned off. It should be noted, however, that slight electric power that is about enough to activate a timer that counts the starting timing is consumed in the hibernation state. That is, the amount of power consumption becomes very small when the controller 51 is brought into the hibernation state.

Subsequently, the controller 51 determines whether or not the hibernation time Tc has elapsed since the re-transmission process is executed in the hibernation state (S14). This determination is continuously made before the hibernation time Tc elapses (S14: No). That is, the timer keeps operating. When the hibernation time Tc elapses (S14: Yes), the controller 51 starts the controller 51 itself as a starting process Pr2 (S15). That is, the controller 51 is turned on to consume at least standby power. The process is then returned. That is, the controller 51 executes the next acquisition process (S1 in FIG. 4A).

As illustrated in FIG. 5, for example, the hibernation time Tc corresponding to the first processing facility A and the hibernation time Tc corresponding to the second processing facility B differ from each other with a high probability. Thus, the timing when the information acquisition device 4 corresponding to the first processing facility A wirelessly transmits light emission information acquired next and the timing when the information acquisition device 4 corresponding to the second processing facility B wirelessly transmits light emission information acquired next differ from each other with a high probability. Therefore, a collision between a plurality of transmitted packets wirelessly transmitted next by a plurality of information acquisition devices 4 can be avoided. As a result, the management device 5 can reliably acquire information related to the plurality of processing facilities 2.

In particular, the initial transmission time Ta, the re-transmission time Tb, and the hibernation time Tc are each a time varied in accordance with a random number. Thus, a collision between transmitted packets wirelessly transmitted by the information acquisition devices 4 corresponding to the processing facilities 2 is avoided with a very high probability in the case where the acquisition process and the transmission process are repeatedly performed.

The controller 51 brings the controller 51 itself into the hibernation state during a period from the re-transmission process to the next acquisition process. That is, the controller 51 has a time in which the controller 51 is brought into the hibernation state, rather than performing the acquisition process and the transmission process. Therefore, the amount of power consumption by the controller 51 can be reduced.

The transmission process is preferably executed as early as possible. However, it is effective in reducing the amount of power consumption to keep the controller 51 in the hibernation state as long as possible. Thus, the hibernation time Tc is set to be longer than the initial transmission time Ta, and longer than the re-transmission time Tb.

In particular, the minimum of the hibernation time Tc is not 0 ms. That is, the controller 51 reliably has an opportunity to suppress the amount of power consumption. It should be noted, however, that a sufficient effect in reducing the amount of power consumption cannot be secured if the hibernation time is too short. Thus, the minimum of the hibernation time Tc is set to 500 ms so that the controller 51 is reliably brought into the hibernation state for at least 500 ms for each acquisition process. Therefore, the controller 51 can be brought into the hibernation state to such a degree that a sufficient effect can be obtained.

Meanwhile, the maximum of the hibernation time Tc is set to 1000 ms. This is decided on the basis of the maximum cycle of the acquisition process. That is, the information acquisition device 4 executes the acquisition process in a cycle of about 1000 ms at a maximum. The maximum of the hibernation time Tc can be changed, as appropriate, in accordance with the sampling cycle.

As discussed above, in the case where there are variations in detection values from the sensors 41a, 41b, and 41c (S2: Yes), as illustrated in FIGS. 4A and 4B, the controller 51 executes the hibernation process after the initial transmission process and the re-transmission process are executed, and thereafter executes the next acquisition process. In the case where there are not variations in detection values (S2: No), on the other hand, the controller 51 determines whether or not the unsent number counter i has reached n (S10). If the unsent number counter i has not reached n (S10: No), the controller 51 increments the unsent number counter i (S11), and executes the process in S12 in FIG. 4B.

Figure 6:
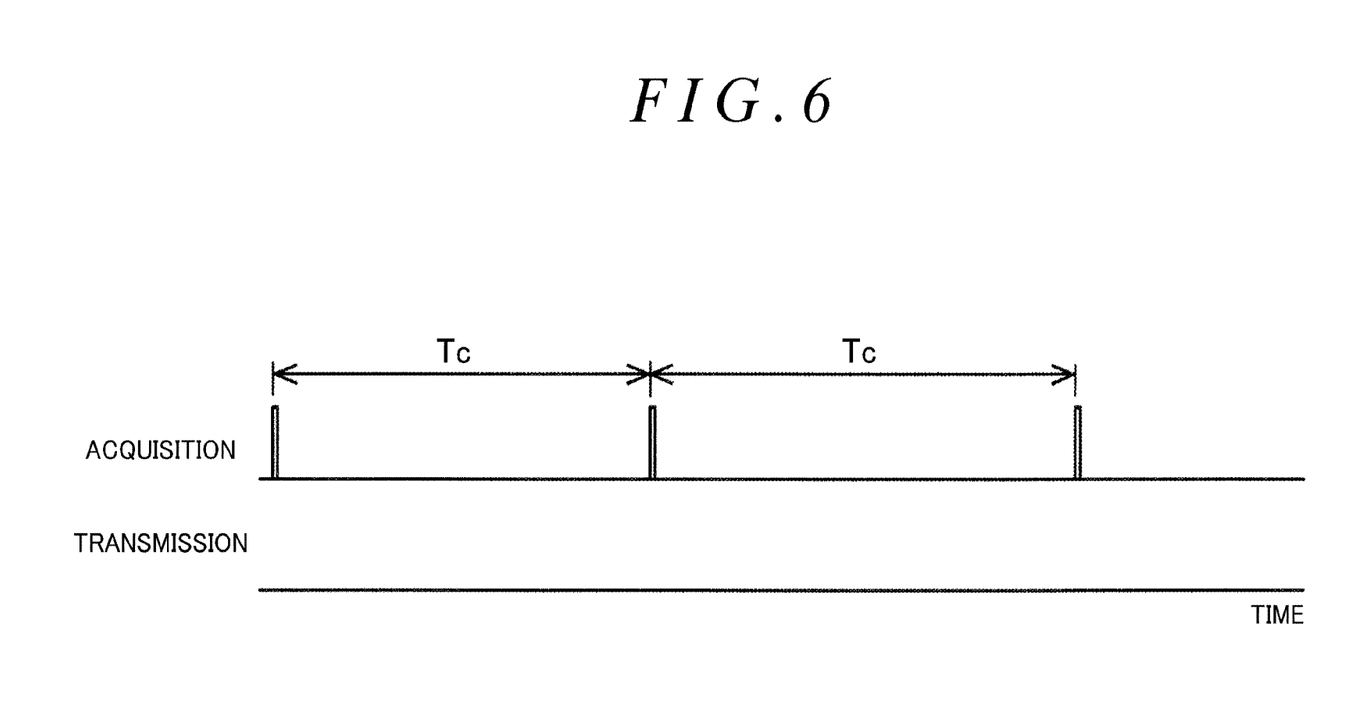
FIG. 6 is a timing chart related to the acquisition process and the transmission process performed by the information acquisition device in the case where there are not variations in detection values from the sensors.

In the case where there are not variations in detection values (S10: No), the hibernation random number Rc is decided (S12) after the acquisition process is executed, and the controller 51 is brought into the hibernation state until the hibernation time Tc elapses (S14). In this case, as illustrated in FIG. 6, the initial transmission process and the re-transmission process are not executed, but the hibernation process Pr1 is executed, after the acquisition process is executed. After that, the starting process Pr2 is executed, and thereafter the next acquisition process is executed (S1). Thus, the hibernation time Tc is equivalent to the time from execution of the acquisition process to execution of the next acquisition process.

Figure 7:
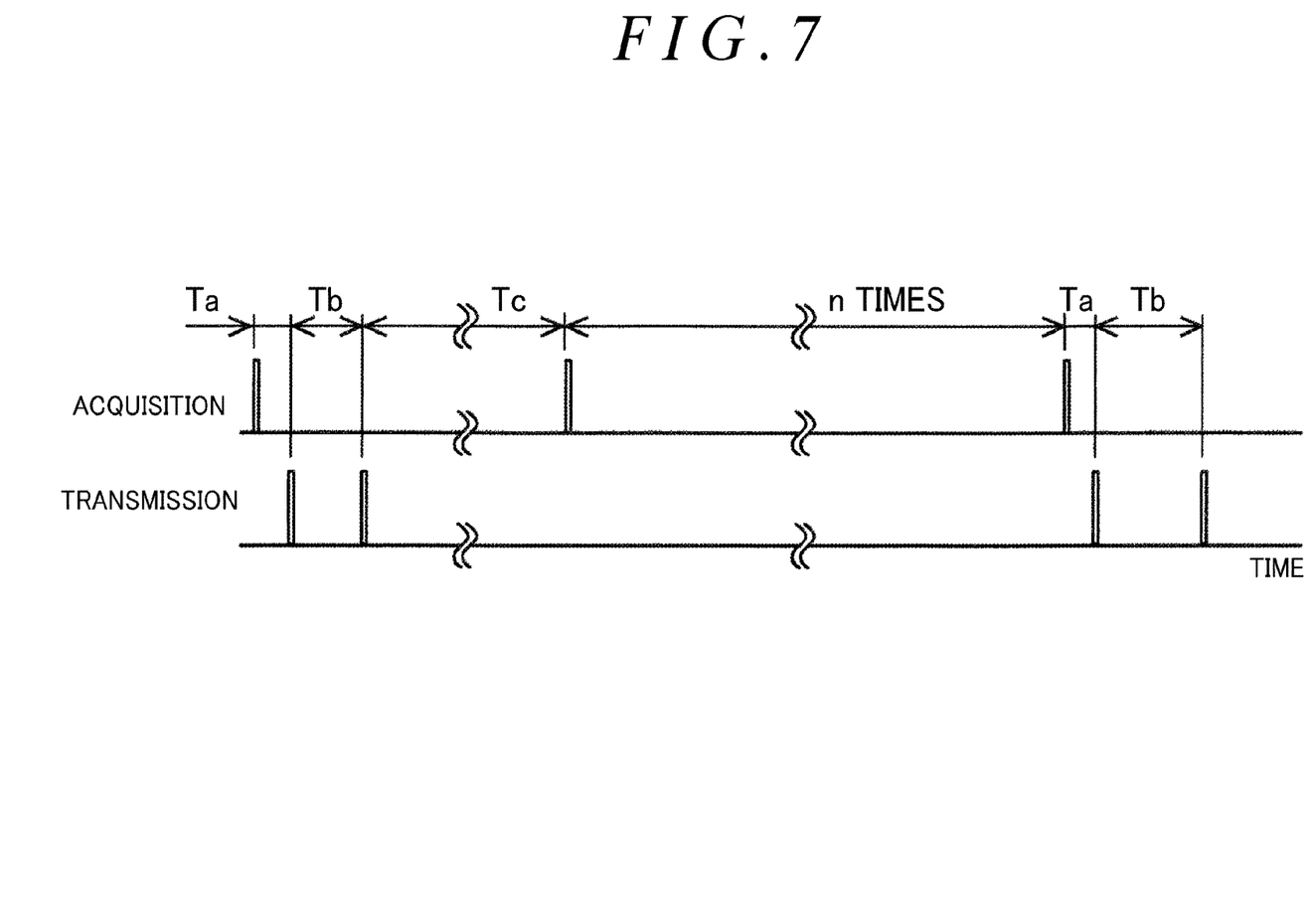
FIG. 7 is a timing chart related to the acquisition process and the transmission process performed by the information acquisition device in the case where an unsent number counter i reaches n.

In the case where there are not variations in detection values n times consecutively, the unsent number counter i reaches n in S10 in FIG. 4A (S10: Yes). In this case, the processes in and after step S3 are executed. That is, as illustrated in FIG. 7, even if there are not variations in detection values, the controller 51 forcibly executes the initial transmission process and the re-transmission process (S5 and S8 in FIG. 4A) in the case where there are not variations in detection values n times consecutively. After that, the controller 51 executes the hibernation process again (S13 in FIG. 4B), and thereafter executes the next acquisition process (S1 in FIG. 4A).

In this case, since there are not variations in detection values, the management device 5 does not change the state of the corresponding processing facility 2. However, the information acquisition device 4 and the management device 5 are not connected to each other in a wired manner. Further, the information acquisition device 4 only performs a transmission process to the management device 5, and does not perform a reception process from the management device 5. Therefore, the management device 5 cannot determine if there are not variations in detection values, or if the information acquisition device 4 suffers from a failure or a shortage of power supply, unless information is received from the information acquisition device 4.

Thus, the controller 51 executes the transmission process, even if there are not variations in detection values, in the case where a predetermined period has elapsed since the preceding transmission process. Consequently, the management device 5 can determine that the information acquisition device 4 operates normally. In the case where information still cannot be received even when a period that is longer than the predetermined period has elapsed since the preceding reception process, the management device 5 can determine that some abnormality has occurred in the information acquisition device 4. For example, a worker replaces a battery in the case of a shortage of electric power from the first power source 52 of the information acquisition device 4, and checks or repairs the information acquisition device 4 in the case of a failure thereof.

Figure 8:
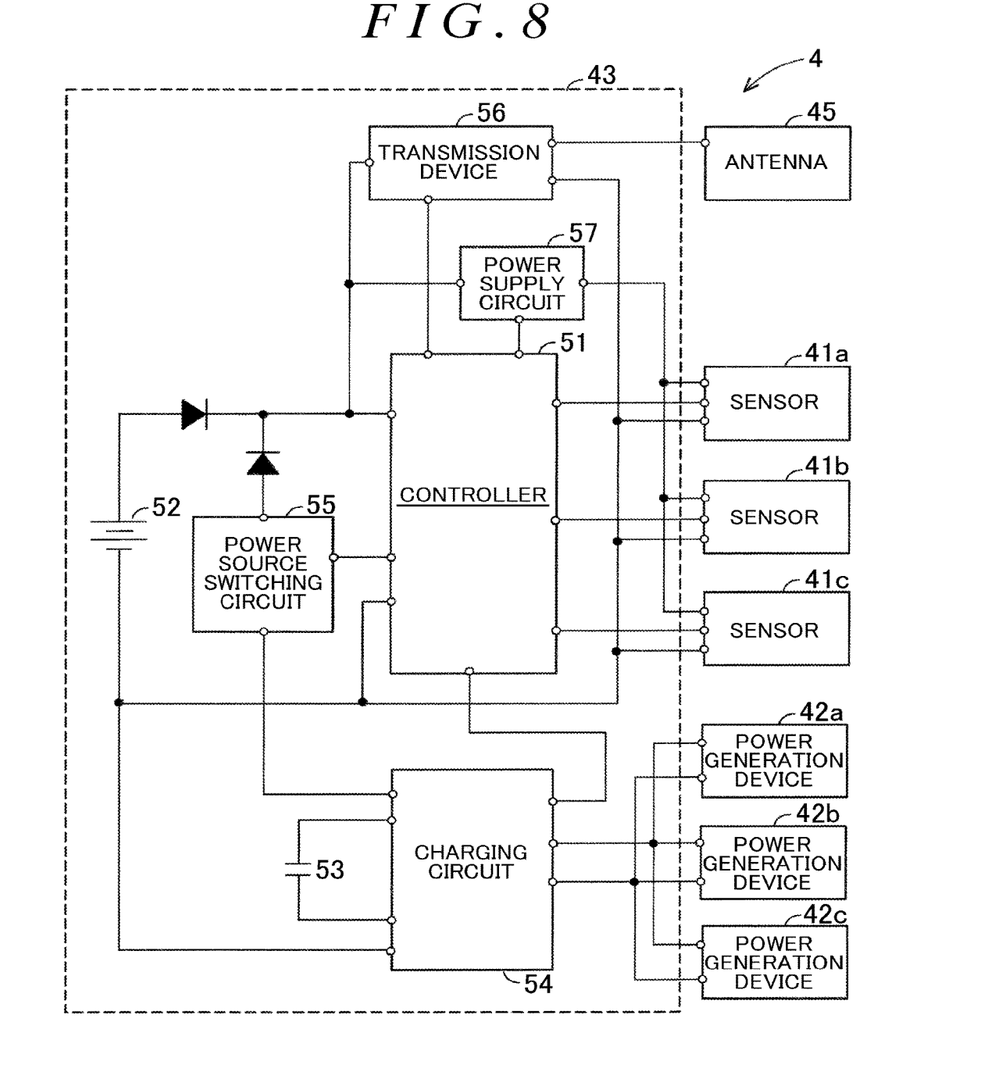
FIG. 8 illustrates the circuit configuration of an information acquisition device according to a second embodiment.

An information acquisition device 4 according to a second embodiment will be described with reference to FIG. 8. As illustrated in FIG. 8, the device body 43 of the information acquisition device 4 includes a power supply circuit 57 in addition to the controller 51, the first power source 52, the second power source 53, the charging circuit 54, the power source switching circuit 55, and the transmission device 56.

The power supply circuit 57 switches a state in which electric power from the first power source 52 and the second power source 53 is supplied to the sensors 41a, 41b, and 41c. That is, the power supply circuit 57 switches between a state (supply state) in which electric power is supplied to the sensors 41a, 41b, and 41c and a state (stop state) in which supply of electric power is stopped. The controller 51 controls the power supply circuit 57 between the supply state and the stop state.

The acquisition process and the transmission process which are performed by the controller 51 will be described with reference to FIGS. 4A and 9. In S1 to S11 in FIG. 4A, the controller 51 performs the same process as in the first embodiment.

Figure 9:
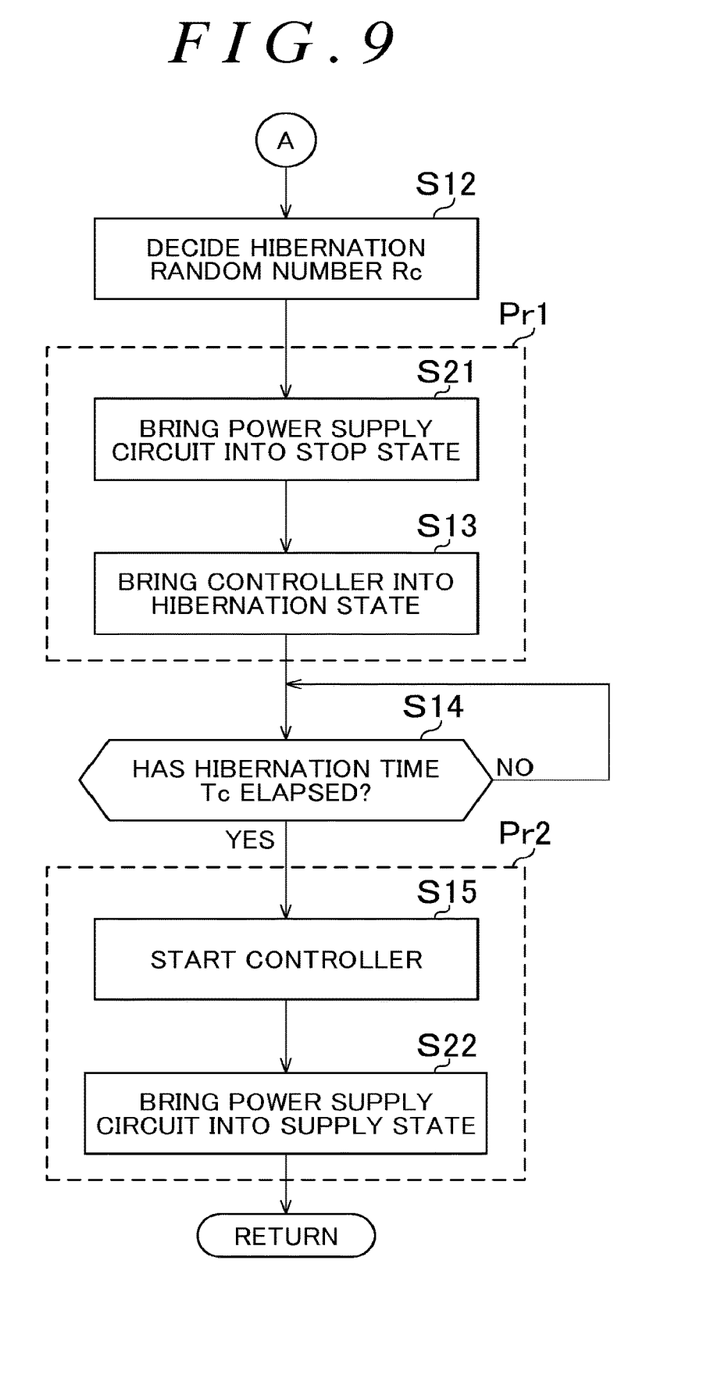
FIG. 9 is a flowchart of acquisition and transmission processes performed by a controller of the information acquisition device.

As illustrated in FIG. 9, the controller 51 decides the hibernation random number Rc (S12), and the controller 51 brings the controller 51 itself into the hibernation state as the hibernation process Pr1 (S13). Further, the controller 51 brings the power supply circuit 57 into the stop state to stop supply of electric power to the sensors 41a, 41b, and 41c as the hibernation process Pr1 (S21).

Subsequently, the controller 51 determines whether or not the hibernation time Tc has elapsed in the hibernation state (S14). When the hibernation time Tc elapses (S14: Yes), the controller 51 starts the controller 51 itself as the starting process Pr2 (S15). Further, the controller 51 brings the power supply circuit 57 into the supply state to start supply of electric power to the sensors 41a, 41b, and 41c as the starting process Pr2 (S22). The process is then returned.

In the present embodiment, in the case where there are variations in detection values from the sensors 41a, 41b, and 41c, the controller 51 executes a process of bringing the controller 51 itself into the hibernation state and stopping supply of electric power to the sensors 41a, 41b, and 41c as the hibernation process Pr1 during a period from the re-transmission process to the next acquisition process. In the case where there are not variations in detection values from the sensors 41a, 41b, and 41c, meanwhile, the controller 51 executes the hibernation process Pr1 described above during a period from the acquisition process to the next acquisition process. In this manner, supply of electric power to the sensors 41a, 41b, and 41c is stopped as the hibernation process Pr1, which further reduces the amount of power consumption.

In the above description, the controller 51 is configured to include the power supply circuit 57. The power supply circuit 57 may be incorporated in the sensors 41a, 41b, and 41c themselves, rather than the controller 51. Also in this case, the power supply circuit 57 can perform substantially the same process as that described above.

What is claimed is:

1. A facility management system comprising:
  a plurality of processing facilities;
  a plurality of signal lamps that indicate information on the plurality of processing facilities, respectively;
  a plurality of information acquisition devices that are attached to the plurality of signal lamps, respectively, that acquire light emission information on the plurality of signal lamps, respectively, and that wirelessly transmit the light emission information; and
  a management device that wirelessly receives the light emission information which is transmitted by each of the plurality of information acquisition devices and that manages a state of the corresponding processing facility on the basis of the light emission information, wherein:
  each of the plurality of information acquisition devices includes a sensor that acquires the light emission information and a controller that controls the sensor;
  the controller executes an acquisition process of acquiring the light emission information using the sensor, a transmission process of wirelessly transmitting the light emission information executed after the acquisition process, and a hibernation process of bringing the controller into a hibernation state corresponding to a power-saving mode executed in a period from the transmission process to the next acquisition process; and
  a time of the hibernation process is a variable time set in accordance with a hibernation random number.

2. The facility management system according to claim 1, wherein
  a time from the acquisition process to the transmission process is a variable time set in accordance with a transmission random number.

3. The facility management system according to claim 2, wherein
  the time of the hibernation process is longer than the time from the acquisition process to the transmission process.

4. The facility management system according to claim 1, wherein:
  each of the plurality of information acquisition devices executes, as the transmission process, an initial transmission process of wirelessly transmitting the light emission information after the acquisition process and a re-transmission process of wirelessly transmitting the light emission information again after the initial transmission process; and a time from the initial transmission process to the re-transmission process is a variable time set in accordance with a re-transmission random number.

5. The facility management system according to claim 4, wherein
the time of the hibernation process is longer than the time from the initial transmission process to the re-transmission process.

6. The facility management system according to claim 4, wherein
a maximum value of the variable time from the initial transmission process to the re-transmission process is set to be larger than a maximum value of a variable time from the acquisition process to the initial transmission process.

7. The facility management system according to claim 1, wherein
each of the plurality of information acquisition devices executes:
the acquisition process of acquiring a brightness of light emitted by the signal lamp as the light emission information;
the transmission process of wirelessly transmitting the light emission information in the case where a variation in the brightness is equal to or more than a threshold; and
the hibernation process of bringing the controller into the hibernation state during a period from the transmission process to the next acquisition process and bringing the controller into the hibernation state during a period from the acquisition process to the next acquisition process in the case where the variation in the brightness is less than the threshold.

8. The facility management system according to claim 7, wherein
each of the plurality of information acquisition devices executes the transmission process, even if the variation in the brightness is less than the threshold, in the case where the variation in the brightness is less than the threshold in a predetermined number of acquisitions consecutively after the transmission process.

9. The facility management system according to claim 1, wherein
the hibernation process includes bringing the controller into the hibernation state corresponding to the power-saving mode and stopping supply of electric power to the sensor.

* * * * *